May 11, 1965  R. P. PROBERT ETAL  3,182,453
COMBUSTION SYSTEM
Original Filed March 22, 1957  3 Sheets-Sheet 1
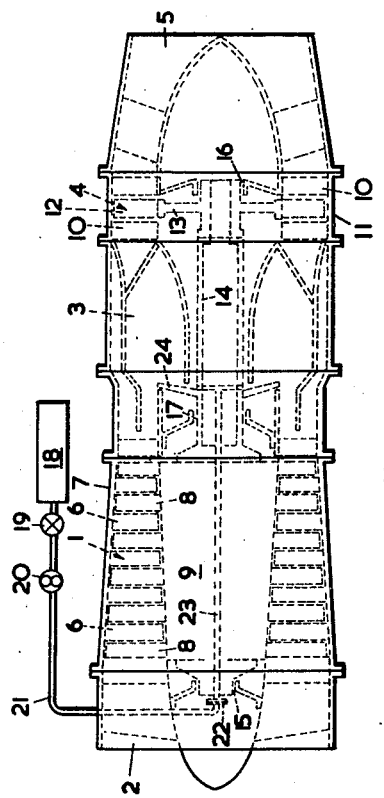
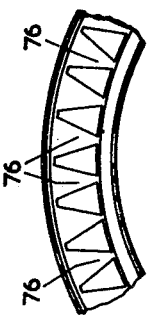
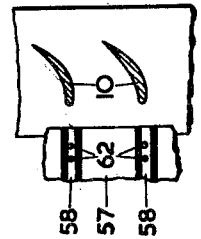
Rhys Price Probert
Peter Martin
Edward L. Hartley
Inventors
By
Stevens Davis Miller & Mosher
Attorneys Rhys Price Probert
Peter Martin
Edward L. Hartley
Inventors By
Stevens Davis Miller & Mosher
Attorneys May 11, 1965  R. P. PROBERT ETAL  3,182,453
COMBUSTION SYSTEM
Original Filed March 22, 1957  3 Sheets-Sheet 3

Rhys Price Probert
Peter Martin
Edward L. Hartley
    Inventors

By Stevens Davis Miller & Mosher
    Attorneys

3,182,453
COMBUSTION SYSTEM
Rhys Price Probert, Farnborough, Peter Martin, Farnham, and Edward Langford Hartley, Farnborough, England, assignors, by mesne assignments, to Power Jets (Research and Development) Limited, London, England, a British company
Original application Mar. 22, 1957, Ser. No. 647,918, now Patent No. 3,126,705, dated Mar. 31, 1964. Divided and this application Oct. 4, 1961, Ser. No. 142,799
Claims priority, application Great Britain, Mar. 26, 1956, 9,313/56
5 Claims. (Cl. 60—39.66)

This invention relates to combustion apparatus particularly for use in gas turbine plant. In conventional gas turbine plant in which a compressor discharges a stream of air into a combustion chamber wherein fuel is burnt in the air stream and the combustion gases so produced are discharged through a turbine which drives the compressor, the length of the flow path between the compressor and the turbine is determined partly by the means used for atomisation of the fuel and mixing of the fuel with the air stream in the combustion chamber, and partly by the degree of diffusion required between the compressor air outlet and the combustion chamber air inlet. If such diffusion could be dispensed with a reduction in the length of the said flow path could be made. This would however involve an air velocity at the combustion chamber inlet which is impracticable with the combustion apparatus in general use at present.

In most conventional forms of gas turbine plant the combustion chamber comprises a perforated flame tube and an outer wall which forms with the flame tube a duct for secondary air. The secondary air flowing in this duct passes through the perforations in the flame tube along its length and mixes with the combustion gases within the flame tube. The length of such combustion chamber is therefore dependent at least partly on the degree of mixing of gases and air required befor they enter the turbine. According to the present invention, the combustion chamber has a substantially imperforate flame tube surrounded by a casing and secondary air flowing between the flame tube and the casing is mixed with the combustion gases between the inlet guide vanes of the turbine; in this way a reduction may be effected both in the length of the combustion chamber and in the pressure losses within the chamber. In addition, by directing the secondary air on to these guide vanes, cooling of the vane is effected.

Two specific embodiments of the present invention as applied to a gas turbine jet propulsion plant are shown in the accompanying drawings in which:

FIGURE 1 is a diagrammatic side view of a gas turbine jet propulsion plant.

FIGURES 3, 4 and 5 are sections on the lines III—III, IV—IV, and V—V respectively of FIGURE 2

FIGURE 7 is a section on the line VII——VII of FIGURE 6.

Figure 2:
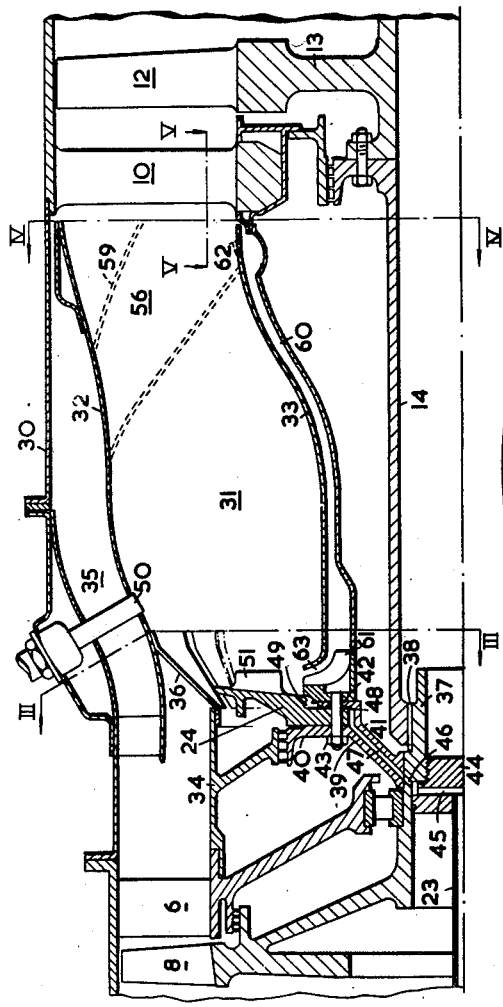
FIGURE 2 is a longitudinal half-sectional view showing in detail part of the gas turbine plant of FIGURE 1.

The gas turbine shown in FIGURE 1 has an axial-flow compressor 1 receiving air from atmosphere through an annular intake 2, an annular combustion chamber 3 into which the compressor discharges air under compression, an axial-flow turbine 4 connected to receive combustion gases from the combustion chamber and secondary air from the compressor, and a jet pipe 5 through which the turbine exhaust gases discharge to atmosphere as a propulsive jet. The compressor comprises stator blade 6 supported on a stator casing 7 and rotor blades 8 supported on a rotor body 9, and similarly the turbine comprises stator blades 10 supported on a stator casing 11 and rotor blades 12 supported on a rotor disc 13, the compressor rotor body and the turbine rotor disc being connected by a shaft 14 which extends along the axis of the plant. This rotor structure is supported on the axis of the plant on a front bearing 15, a rear bearing 16 and in certain instances by an intermediate bearing 17, although it is envisaged that by suitable dimensioning of components this intermediate bearing may be omitted. Fuel is introduced into the combustion chamber from a fuel tank 18 through a control valve 19, a pump 20, a first fuel pipe 21 which extends across the air intake and terminates in a rotary seal 22, a second fuel pipe 23 which extends from the rotary seal axially through the compressor rotor, and a fuel-carrying disc 24 mounted for rotation with the shaft on to the surface of which fuel is conducted from the second pipe.

As shown in greater detail in FIGURE 2, the combustion chamber is formed by an outer casing 30 and a flame tube 31 having outer and inner flame tube walls 32, 33, the inlet end of the combustion chamber, which is closely adjacent to the outlet of the compressor, being annular and defined between the outer casing 30 and an inner wall 34 supported by the radially inner end of a row of compressor outlet stator blades 6. The flame tube outer wall 32 divides the airflow from the compressor into two annular streams, one flowing over the outside of the flame tube through a duct 35 formed between the wall 32 and the casing 30 and the other flowing into the flame tube. The air inlet to the flame tube is divided into a large number of individual streams by means of fingers 36 which extend transversely across the inlet and serve to produce an even flow of air into the flame tube. The outer wall of the flame tube is substantially imperforate, that is to say the wall is either imperforate over its entire length or provided with only a small number of holes or slits to admit a small quantity of air from the duct 35 sufficient for example to form a protective layer of cooling air over the inner surface of this wall.

At the rearward end of the compressor, the compressor rotor is formed with a rearwardly extending stub shaft 37 which is journalled in the intermediate bearing 17 and rearward of the bearing is provided with splines 38 which engage the forward end of the shaft 14. A truncated conical support member 39 mounted on the stub shaft between the splines and the bearing is provided with a radial flange 40 at its rearward end, and the fuel disc 24 is held in position on this flange by a second similar support member 41 flanged at 42 which also is mounted on the shaft, the disc being secured between the two flanges by bolts 43, and so dimensioned that its periphery, which is spaced from the outer wall of the flame tube, is swept by the annular air stream entering the flame tube. A fuel distributing plug 44 provided with radial passages 45 is threaded into the hollow interior of the stub shaft 37 and is connected to the rearward end of the second fuel pipe 23 so that by way of apertures 46 in the wall of the stub shaft, a path for fuel is formed from the pipe 23 to a space 47 between the support members 39, 41, Radial slots 48 formed in the forward face of the flange 42 allow fuel from the space 47 to flow into an annular trough 49 formed in the rearward face of the disc 24, from which under centrifugal force it spills on to the exposed radially outer portion of the rearward surface of the disc. This exposed surface portion is slightly inwardly coned, the angle which the coned portion of the surface makes with a radial plane being not less than 1½°, preferably between 3° and 5°, so that the fuel is caused to adhere to the disc surface by centrifugal force as it spreads radially outwards over the disc. Since the rearward or downstream facing surface of the disc forms the upstream boundary wall of the combustion space within the flame tube, the fuel flowing radially outwards over this surface serves to protect the surface from the heat of the combustion gases within the flame tube.

Figure 3:
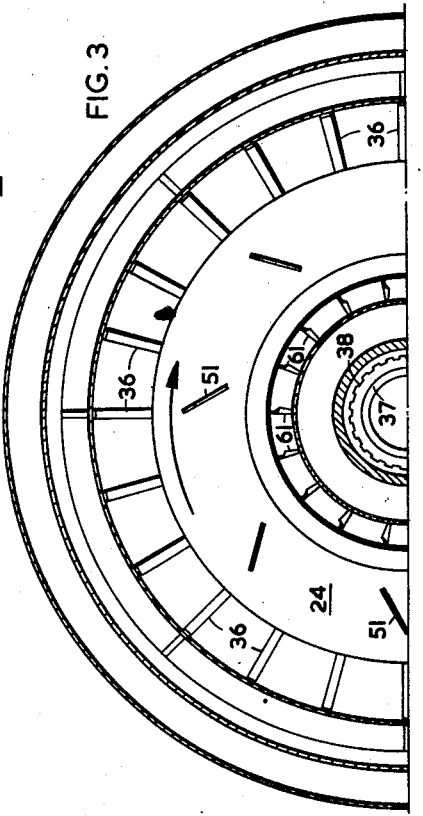

The apertures 46 in the stub shaft and the dimensions of the fuel exit through the trough 49 are so arranged that over at least part of the range of operating speeds of the shaft and consequently of the fuel disc, such quantity of fuel may be carried by the disc as will produce a sheet of fuel as distinct from a fuel spray thrown off centrifugally from the disc into the incoming high velocity air stream so that a high degree of atomisation is effected. One or more igniters 50 extend through the outer wall of the flame tube within the fuel and air mixing zone downstream of the fuel-carrying disc in which primary combustion takes place. In order to assist combustion of the fuel/air mixture in this primary combustion zone by increasing the natural turbulence of the mixture, and thereby producing a shortening of the flame length within the flame tube, paddles 51 are mounted for rotation on the rearward face of the fuel disc as shown more clearly in FIGURE 3. The angle which these paddles make with a radius of the disc is between about 60° and 85°, preferably in the region of the latter.

Figure 4:
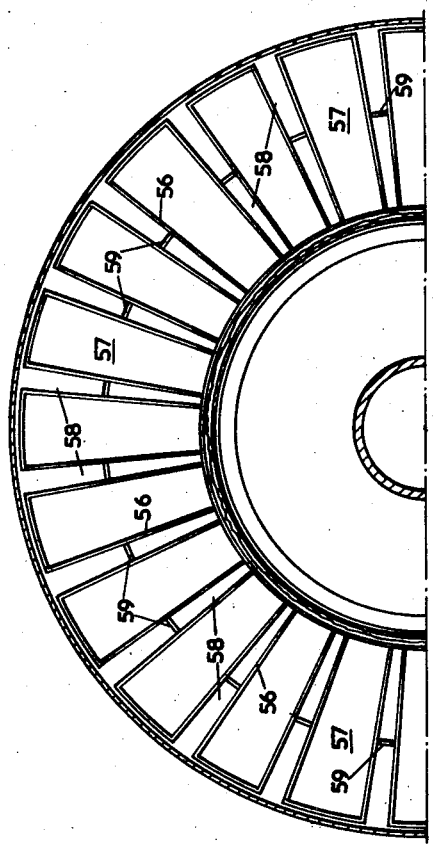

The downstream end of the flame tube outer wall 32 is corrugated to form a number of longitudinally extending chutes 56 which are equally spaced apart circumferentially and accordingly form circumferentially alternating passages 57, 58 for hot gases from the interior of the flame tube and for secondary air from the duct formed between the outer wall of the flame tube and the casing, respectively. The chutes extend across the full width of the combustion chamber outlet but the passages formed by the chutes may be subdivided by thin vanes 59 into a number of individual passages to assist in producing a smooth gas flow. The sides of the chutes may be parallel, but preferably they converge towards the axis of the plant as shown in FIGURE 4.

The inlet guide vanes 10 of the turbine are located across the combustion chamber outlet path immediately downstream of the outlet of the chutes and as shown in FIGURE 5, each chute is so aligned with respect to a turbine inlet guide vane as to cause the secondary air to flow mainly over the convex surface of the guide vane, only sufficient being directed on to the concave surface as is needed to distribute a thin film of air over the surface for cooling purpose. Some of the secondary air flowing over the convex surface of a vane gravitates off towards the concave surface of the next adjacent guide vane and in so doing mixes with the combustion gases in the guide vane passages. By means of this arrangement, good mixing of the secondary air and combustion gases is effected without destroying the general axial flow of each, and in consequence the pressure losses in mixing are low.

The inner wall 33 of the flame tube is of hollow construction to provide a passage 60 through the hollow interior of the wall for cooling air, and the radially inner ends of the secondary air passages 58 are placed in communication with the passage 60 by means of apertures 62 in the wall 33 at the downstream end of the flame tube which form the inlet to the passage so that some of the secondary air is metered into this passage and flows in the forward direction to an outlet 63 at the upstream end of the flame tube. A small fan 61 in the form of a centrifugal compressor rotor, is mounted at this outlet for rotation with the disc 24 to create a region of low pressure at the outlet which serves to draw secondary air through the passage 60 and to discharge this air into the primary combustion zone within the flame tube.

Figure 6:
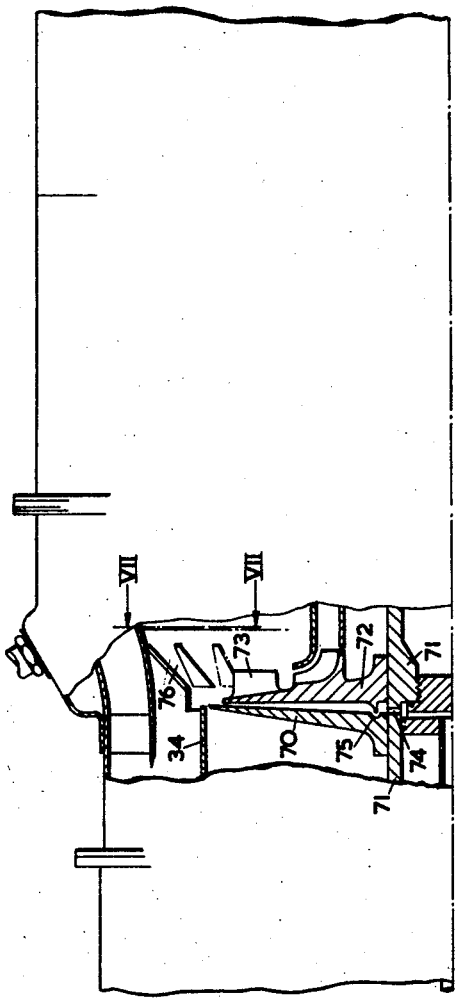
FIGURE 6 is a view, corresponding to the view shown in FIGURE 2, of an alternative form of combustion means.

FIGURE 6 shows diagrammatically a modification of the embodiment of FIGURE 2 in which a fuel-carrying disc 70 is supported directly on a shaft 71 connecting the turbine rotor 13 to drive the compressor rotor 9, and a separate disc 72 also supported on the shaft 71 is provided, on the downstream side of the fuel disc, on which turbulence-forming paddles 73 are carried. Fuel is admitted to the space between the two discs through apertures 74 in the shaft, and flows into an annular trough 75 formed in the surface of the disc 70 from which it is distributed over the disc surface.

FIGURE 6 also shows a modified form of flame tube inlet in which fingers 76 of triangular shape extend radially inwards across this inlet terminating short of the wall 34; by this arrangement the air flow adjacent the wall 34 is uninterrupted and thus enters the flame tube as a truly annular stream. As shown in FIGURE 7, the passages between the fingers 76 are tapered and expand in the radially inward direction so that the air flow is metered into the flame tube, increasing in the radially inward direction. Either or both of these features may equally be applicable to the fingers 36 of the first embodiment.

In a further modification, the fuel conduit in the hollow shafting may be replaced by one or more stationary pipes which terminate in nozzles located near the centre of the fuel-carrying disc from which nozzles fuel is supplied directly on to the surface of the fuel disc. In another modification in which one or more additional sets of rotary paddles are required, for example to increase turbulence in a downstream part of the flame tube, at least part of the inner wall of the flame tube may be mounted on the shaft 14 or 71 and such additional paddles may be supported on the rotary portion of the wall. In yet another modification, secondary air may be supplied to the hollow interior of the flame tube inner wall through pipes which extend through the chutes into the interior of this wall, or alternatively through cooling air ducts formed through the turbine inlet guide vanes 10 or the shaft 14 or 71.

The present application is a division of copending patent application Serial No. 647,918, filed March 22, 1957, now Patent No. 3,126,705 in the names of the present applicants.

We claim:

1. Gas turbine plant comprising a compressor, an annular combustion chamber and a turbine; said combustion chamber comprising an annular flame tube having inner and outer walls, an inlet from the compressor at one end and an outlet connected to the turbine inlet at the other end, means for supplying fuel to the interior of the flame tube, and an aircasing enclosing said flame tube and defining with said outer wall thereof an annular duct for conducting air from the compressor to the turbine inlet; said turbine comprising a row of turbine inlet guide vanes having opposite concave and convex faces; and said flame tube outer wall being formed at its downstream end into longitudinally extending chutes forming circumferentially alternating passages for discharging streams of air from said annular duct and combustion gases from said flame tube, the chutes extending to the plane of the turbine inlet and being arranged so that each said stream of air is so aligned with one of said inlet guide vanes that a small portion of said stream is discharged on to the concave face of the vane and the greater portion on to the convex face of the vane.

2. Gas turbine plant according to claim 1 wherein said flame tube outer wall is substantially imperforate.

3. Gas turbine plant according to claim 1 wherein said turbine inlet guide vanes are equal in number to said passages for discharging streams of air.

4. Gas turbine plant according to claim 1 wherein said flame tube inner wall is of hollow construction, the hollow interior thereof having an inlet at its turbine end in communication with said turbine inlet and connected to receive air from said annular duct and an outlet at its compressor end opening into the interior of the flame tube.

5. Gas turbine plant comprising a combustion chamber which includes a flame tube and a duct for air connected to by-pass the flame tube, a turbine, an inlet to said turbine guide vanes in said inlet, each guide vane having one concave face and one convex face, a plurality of longitudinally-extending chutes defining a first set of passages for air flowing from the duct to the turbine and a second set of passages alternating with the passages of said first set for combustion gases flowing from the flame tube to the turbine, each said chute extending to the plane of the turbine inlet being aligned with a separate inlet guide vane of the turbine to discharge a small portion of the air flowing therethrough on to the concave face of the vane and the greater portion of said air on to the convex face of the vane.

References Cited by the Examiner
UNITED STATES PATENTS

| | | | |
|---|---|---|---|
| 2,434,134 | 1/48 | Whittle | 60—35.6 |
| 2,630,679 | 3/53 | Sedille | 60—39.65 |
| 2,704,440 | 3/55 | Nicholson | 60—39.65 |
| 2,780,060 | 2/57 | Griffith | 60—39.65 X |
| 2,827,759 | 3/58 | Bruckmann | 60—39.65 X |
| 2,922,278 | 1/60 | Szydlowski | 60—39.74 X |

SAMUEL LEVINE, *Primary Examiner.*

JULIUS E. WEST, *Examiner.*